(12) United States Patent
Buss et al.

(10) Patent No.: US 11,530,930 B2
(45) Date of Patent: Dec. 20, 2022

(54) TRANSPORTATION VEHICLE CONTROL WITH PHONEME GENERATION

(71) Applicant: VOLKSWAGEN AKTIENGESELLSCHAFT, Wolfsburg (DE)

(72) Inventors: Okko Buss, Berlin (DE); Mark Pleschka, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 78 days.

(21) Appl. No.: 16/644,328

(22) PCT Filed: Sep. 12, 2018

(86) PCT No.: PCT/EP2018/074593
§ 371 (c)(1),
(2) Date: Mar. 4, 2020

(87) PCT Pub. No.: WO2019/057580
PCT Pub. Date: Mar. 28, 2019

(65) Prior Publication Data
US 2020/0209008 A1 Jul. 2, 2020

(30) Foreign Application Priority Data
Sep. 19, 2017 (DE) .................. 10 2017 216 571.5

(51) Int. Cl.
*G10L 13/00* (2006.01)
*G01C 21/36* (2006.01)
(Continued)

(52) U.S. Cl.
CPC .......... *G01C 21/3608* (2013.01); *G06N 3/08* (2013.01); *G10L 15/02* (2013.01); *G10L 15/187* (2013.01);
(Continued)

(58) Field of Classification Search
CPC ...... G01C 21/3608; G01C 21/26; G06N 3/08; G10L 15/02; G10L 15/187; G10L 2015/025; G10L 2015/027; G10L 15/04
See application file for complete search history.

(56) References Cited

U.S. PATENT DOCUMENTS 5,675,705 A 10/1997 Singhal
7,873,517 B2 1/2011 Prieto et al.
(Continued)

FOREIGN PATENT DOCUMENTS

CN 105632486 A 6/2016
CN 106098059 A 11/2016
(Continued)

OTHER PUBLICATIONS

Rentzepopoulos, Panagiotis A. and Kokkinakis, George K., "Efficient Multilingual Phoneme-to-Grapheme Conversion Based on HMM", Computational Linguistics vol. 22 Issue Sep. 3, 1996 pp. 351-376 (Year: 1996).*
(Continued)

*Primary Examiner* — Bhavesh M Mehta
*Assistant Examiner* — Nandini Subramani
(74) *Attorney, Agent, or Firm* — Barnes & Thornburg LLP

(57) ABSTRACT

A transportation vehicle having a navigation system and an operating system connected to the navigation system for data transmission via a bus system. The transportation vehicle has a microphone and includes a phoneme generation module for generating phonemes from an acoustic voice signal or the output signal of the microphone; the phonemes are part of a predefined selection of exclusively monosyllabic phonemes; and a phoneme-to-grapheme module for
(Continued)

generating inputs to operate the transportation vehicle based on monosyllabic phonemes generated by the phoneme generation module.

8 Claims, 3 Drawing Sheets

(51) Int. Cl.
    *G06N 3/08*     (2006.01)
    *G10L 15/02*     (2006.01)
    *G10L 15/187*     (2013.01)

(52) U.S. Cl.
    CPC .. *G10L 2015/025* (2013.01); *G10L 2015/027* (2013.01)

(56) References Cited

U.S. PATENT DOCUMENTS

| | | | |
|---|---|---|---|
| 8,340,958 | B2 | 12/2012 | Gruhn et al. |
| 9,934,777 | B1* | 4/2018 | Joseph .............. G10L 15/22 |
| 11,170,776 | B1* | 11/2021 | Whalin .............. G10L 15/30 |
| 2002/0016669 | A1* | 2/2002 | Ruhl .............. G01C 21/3608 340/988 |
| 2005/0197842 | A1 | 9/2005 | Bergmann et al. |
| 2009/0112593 | A1* | 4/2009 | Konig .............. G06F 16/2423 704/251 |
| 2009/0182559 | A1 | 7/2009 | Gerl et al. |
| 2010/0191520 | A1 | 7/2010 | Gruhn et al. |
| 2011/0184737 | A1* | 7/2011 | Nakano .............. G10L 15/12 704/254 |
| 2012/0173574 | A1* | 7/2012 | Homma .............. G10L 15/26 707/772 |
| 2014/0244255 | A1 | 8/2014 | Nonaka |
| 2015/0127327 | A1 | 5/2015 | Bacchiani et al. |
| 2015/0340034 | A1 | 11/2015 | Schalkwyk et al. |
| 2016/0171974 | A1 | 6/2016 | Hannun et al. |
| 2016/0217367 | A1 | 7/2016 | Moreno et al. |
| 2016/0343376 | A1 | 11/2016 | Cai et al. |
| 2016/0351188 | A1* | 12/2016 | Rao .............. G06N 3/084 |
| 2017/0004824 | A1 | 1/2017 | Yoo et al. |

FOREIGN PATENT DOCUMENTS

| | | |
|---|---|---|
| DE | 102004055609 A1 | 8/2005 |
| DE | 102004061782 A1 | 9/2005 |
| DE | 102007052055 A1 | 5/2008 |
| WO | 0128187 A1 | 4/2001 |

OTHER PUBLICATIONS

B. Decadt, J. Duchateau, W. Daelemans and P. Wambacq, "Transcription of out-of-vocabulary words in large vocabulary speech recognition based on phoneme-to-grapheme conversion," 2002 IEEE International Conference on Acoustics, Speech, and Signal Processing, 2002, pp. I-861-I-864 (Year: 2002).*

F. Eyben, M. Wöllmer, B. Schuller and A. Graves, "From speech to letters—using a novel neural network architecture for grapheme based ASR," 2009 IEEE Workshop on Automatic Speech Recognition & Understanding, 2009, pp. 376-380 (Year: 2009).*

K. Li, X. Qian and H. Meng, "Mispronunciation Detection and Diagnosis in L2 English Speech Using Multidistribution Deep Neural Networks," in IEEE/ACM Transactions on Audio, Speech, and Language Processing, vol. 25, No. 1, pp. 193-207, Jan. 2017 (Year: 2017).*

Ziegler, J. C., Perry, C., & Coltheart, M. (2000). The DRC model of visual word recognition and reading aloud: An extension to German. European Journal of Cognitive Psychology, 12(3), 413-430. (Year: 2000).*

Jilei Tian, J. Nurminen and I. Kiss, "Optimal subset selection from text databases," Proceedings. (ICASSP '05). IEEE International Conference on Acoustics, Speech, and Signal Processing, 2005., 2005, pp. I/305-I/308 vol. 1 (Year: 2005).*

Rao et al.; Multi-Accent Speech Recognition with Hierarchical Grapheme Based Models; 2017 IEEE International Conference on Acoustics, Speech and Signal Processing (CASSP); Jul. 19, 2017; pp. 4815-4819.

Search Report for International Patent Application No. PCT/EP2018/074593; dated Dec. 19, 2018.

* cited by examiner

TRANSPORTATION VEHICLE CONTROL WITH PHONEME GENERATION

PRIORITY CLAIM

This patent application is a U.S. National Phase of International Patent Application No. PCT/EP2018//074593, filed 12 Sep. 2018, which claims priority to German Patent Application No. 10 2017 216 571.5, filed 19 Sep. 2017, the disclosures of which are incorporated herein by reference in their entireties.

SUMMARY

Illustrative embodiments relate to a transportation vehicle, wherein the transportation vehicle comprises a navigation system and a user input control, which is connected to the navigation system via a bus system for data interchange purposes, or a user input control. Illustrative embodiments also relate to a method for manufacturing a transportation vehicle, in particular, the aforementioned transportation vehicle.

BRIEF DESCRIPTION OF THE DRAWINGS

Disclosed embodiments will be described in more detail below with reference to the drawings, in which.

DETAILED DESCRIPTION

Figure 1:
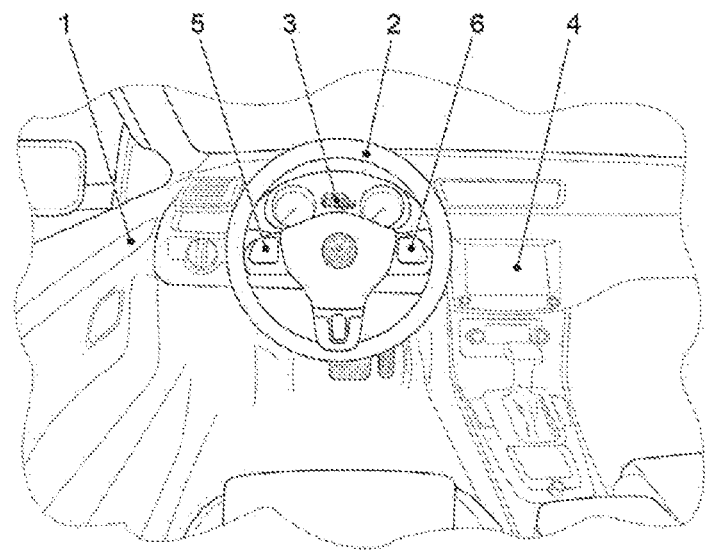
FIG. 1 shows an exemplary embodiment of a transportation vehicle in an interior view.

Control of a system implemented in a transportation vehicle by audible inputs is known, e.g., from WO 01/28187 A1. Audible inputs in association with transportation vehicles are furthermore known from DE 10 2004 055 609 A1, DE 10 2004 061 782 A1 and DE 10 2007 052 055 A1. US 2016/0171974 A1 discloses a voice recognition system with what is known as deep learning. A system therein that requires no phoneme dictionary is supposed to be particularly suitable for loud environments. U.S. Pat. No. 8,340,958 B2 likewise discloses a voice recognition system. This involves the voice input of a user being used by comparison with inputs on a list using voice model statistics.

However, it has been found that, without special technical solutions, voice control systems in transportation vehicles cannot reliably recognize terms spoken by the user that come from large databases, e.g., if the user says an address in Germany or an album name from a more extensive media library. In the case of voice inputs in which the user furthermore chooses a free wording (e.g., "Please take me to Berlin, Carnotstraβe number 4." or "I want to listen to Michael Jackson's Thriller."), the recognition is barely possible unless the input follows a rigid order of terms from a database. To allow recognition of such terms, e.g., the databases to be spoken (e.g., navigation database, media library, etc.) are precompiled into extensive "voice models" in proprietary formats and are stored on the device. The solution to use precompiled voice models has the following drawbacks, however:

High memory space: it requires a large amount of memory space. Voice inputs referencing the navigation database generate, e.g., 1 GB just for the voice model of all German addresses.

Lack of ability to change: precompiled models are not prepared for changes in the data substructure (e.g., in the event of an update from the provider). If, for example, a database changes, the voice models need to be recompiled and reinstalled. Already compiled models therefore become obsolete because new terms from the database are not covered and omitted terms erroneously continue to be recognized. Models thus need to be recompiled and reinstalled, or re-stored, on the device each time.

On the basis of internet connections: systems that use an online connection additionally have the drawback that appropriate processing is not possible when there is no connection (e.g., travel through a radio hole, use in an underground garage, configuration error by user, data volume used up).

Limitation of the user input: the use of precompiled models when available hardware resources are low usually requires a rigid order of the terms in the database. Addresses need to be spoken, e.g., in a stipulated order of city-street-house number (see above).

Further, terms usually need to be voiced in full (e.g., "Wolfgang von Goethe Straβe" instead of "Goethe Straβe").

Terms outside the known available data (e.g., German addresses in Belgium) cannot be recognized.

Disclosed embodiments provide an improved voice recognition system suitable for transportation vehicles and a corresponding voice input. It is desirable to avoid the aforementioned drawbacks.

This is achieved by a transportation vehicle that comprises a navigation system and a user input control, which is connected to the navigation system via a bus system for data interchange purposes, or a user input control, wherein the transportation vehicle has a microphone, wherein the transportation vehicle comprises a phoneme generation module for generating phonemes from a voice signal or the output signal of the microphone, wherein the phonemes are part of a prescribed selection of exclusively monosyllabic phonemes, and wherein the transportation vehicle comprises a phoneme-to-grapheme module for generating inputs for controlling the transportation vehicle on the basis of (a succession of) monosyllabic phonemes generated by the phoneme generation module.

A voice signal within the context of the disclosure is an electrical signal that contains the information content of an audible input, such as, for example, the output signal of a microphone. An electrical signal of this kind or an output signal of this kind from a microphone within the context of the disclosure is a digitized (A/D converted) electrical signal, cf., e.g., u(i) in FIG. 3.

A selection of exclusively monosyllabic phonemes, within the context of the disclosure, is also supposed to be a selection of monosyllabic phonemes with which a small proportion of non-monosyllabic phonemes is mixed substantially without affecting a training of a neural network or without a technical effect, merely with the intention of "exclusively" avoiding the limitation.

A phoneme generation module within the context of the disclosure is or comprises a statistical language model (SLM), in particular, in the ARPA format: various SLM software toolkits provide interfaces to the SLM in the ARPA format, among others Carnegie Mellon University, SRI International, GOOGLE®.

A phoneme-to-grapheme module within the context of the disclosure comprises or is a neural network, in particular, a recurrent neural network, i.e., an RNN (recursive neural network). In at least one disclosed embodiment, such an RNN has an input layer having a dimension that corresponds to the number of phonetic symbols from which syllables can be formed. In a further disclosed embodiment, the dimension of the output layer of the RNN corresponds to the number of characters in the alphabet in the target language. In a another disclosed embodiment, the RNN comprises 2 to 4 intermediate layers (hidden layers). In a further disclosed embodiment, the dimension of an attention layer of the RNN is between 10 and 30. A particularly suitable exemplary embodiment of an RNN is dimensioned as follows:

Unidirectional LSTM (Long-Short-Term-Memory) network having three hidden layers

Dimension of input layer=69 (or the number of phonetic symbols from which syllables were able to formed.)

Dimension of the hidden layers=512

Dimension of output layer=59, or number of characters in the alphabet of the target language.

Dimension of attention layer for "recall"=20

This is moreover achieved—in particular, in conjunction with one of more of the aforementioned features—by a method for manufacturing a transportation vehicle, wherein the method comprises the following operations:

Providing a first database of inputs or commands for controlling functions of the transportation vehicle, in particular, for controlling a navigation system of the transportation vehicle and/or an infotainment system of the transportation vehicle, Generating a second database that may comprise exclusively monosyllabic, phonemes, Generating or training a phoneme generation module by using the first database, Generating or training a phoneme-to-grapheme module by using the second database, Connecting the output of the phenome generation module to the input of the phoneme-to-grapheme module for data interchange purposes, and Implementing the phoneme generation module and the phoneme-to-grapheme module in a transportation vehicle.

Figure 5:
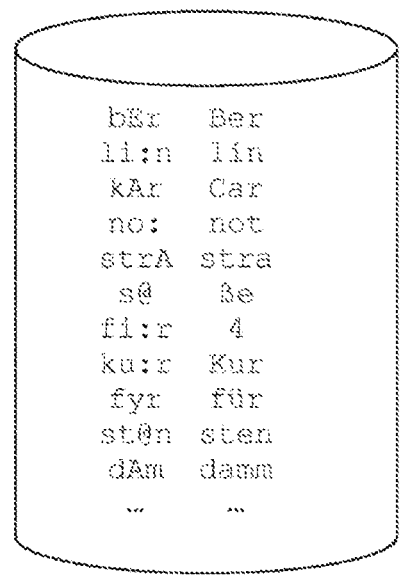
FIG. 5 shows an exemplary embodiment of a second database.

In at least one disclosed embodiment, the second database comprises phonemes that are exclusively monosyllabic. In a further disclosed embodiment, the second database comprises entries associated in pairs, wherein a monosyllabic phoneme has a respective associated (single) monosyllabic term. In another disclosed embodiment, the phoneme-to-grapheme module is trained, substantially exclusively, using entries associated in pairs, which entries comprise a monosyllabic phoneme that has a respective associated (single) monosyllabic term. In a disclosed embodiment, the second database, as depicted in FIG. 5, for example, comprises entries associated in pairs, wherein a monosyllabic phoneme has a respective associated (single) term or (single) meaning, or wherein a monosyllabic phoneme has a respective associated (single) monosyllabic term. This has the following benefits:

Robustness: Errors during syllable recognition in the subword recognition mean more minor errors in the overall sequence that is the input for the phoneme-to-grapheme module. An error at syllable level may therefore have a smaller influence on the output of the RNN.

Accuracy: An SLM trained for syllables carries more content-oriented significance than one for phonemes, since syllables are distributed and constructed more specifically within one domain (e.g., navigation) than in other domains. Phonemes have general validity for the language and therefore carry less information content relevant to the accuracy of the recognition.

It has been found that particularly reliable control by voice input, in particular, particularly reliable control of a navigation system of the transportation vehicle by voice input, is achieved in this manner even under the adverse acoustic conditions in a transportation vehicle.

This is moreover achieved by a voice recognition system, in particular, for a transportation vehicle, wherein the voice recognition system has a microphone, wherein the voice recognition system comprises a phoneme generation module for generating phonemes from a voice signal or the output signal of the microphone, wherein the phonemes are part of a prescribed selection of exclusively monosyllabic phonemes, and wherein the voice recognition system comprises a phoneme-to-grapheme module for generating inputs or commands on the basis of (a succession of) monosyllabic phonemes generated by the phoneme generation module.

A disclosed transportation vehicle may be a land transportation vehicle usable individually in road traffic. Transportation vehicles within the context of the disclosure are not restricted to land transportation vehicles having an internal combustion engine.

Figure 2:
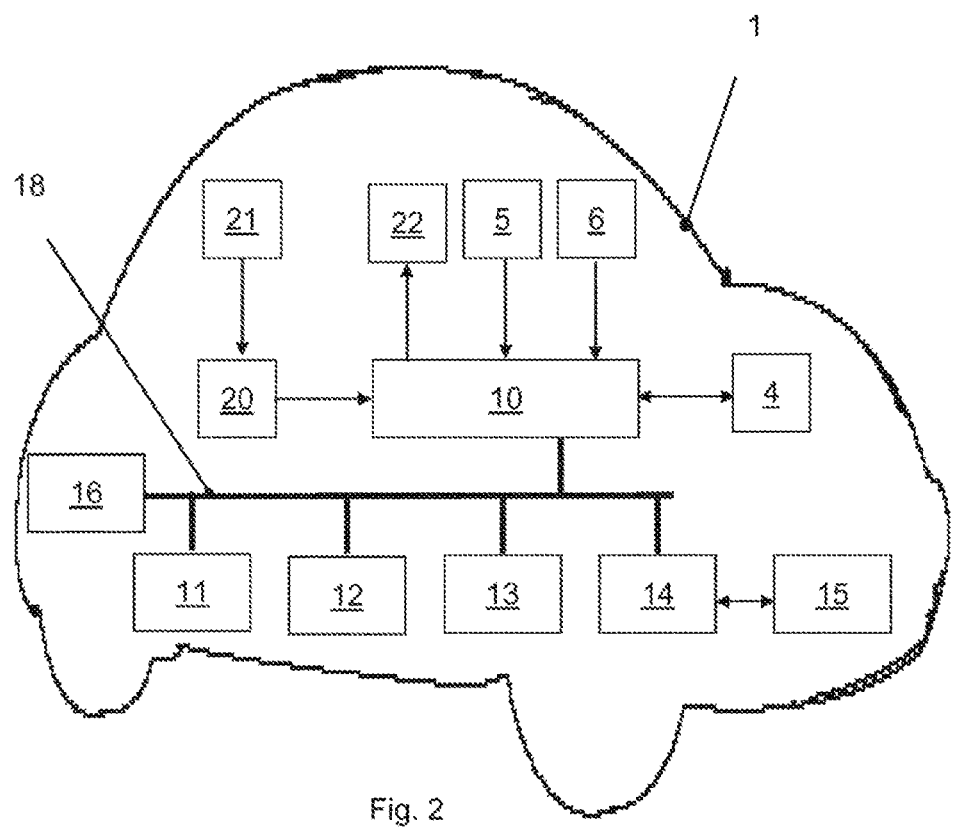
FIG. 2 shows the transportation vehicle of FIG. 1 in a functional schematic diagram.

FIG. 1 shows an exemplary embodiment of a detail interior view of a transportation vehicle 1—depicted in a functional schematic depiction in FIG. 2. The transportation vehicle 1 comprises a combination instrument 3, arranged in front of (or, from the point of view of a driver of the transportation vehicle, behind) a steering wheel 2, and a display 4 above a central console of the transportation vehicle 1. Moreover, the transportation vehicle 1 comprises control elements 5 and 6, e.g., as cross rocker switches, arranged in the spokes of the steering wheel 2. Furthermore, the transportation vehicle 1 comprises a display and user input control 10 for controlling the display 4 and for evaluating inputs made by a touchscreen arranged on the display 4, so that a navigation system 11, an infotainment system 12, an automatic airconditioning system 13, a telephone interface 14 or a telephone 15 coupled via the latter and other functions 16 are controllable, in particular, under menu guidance, by a touchscreen. To this end, the display and user input control 10 is connected to the navigation system 11, to the infotainment system 12, to the automatic airconditioning system 13, to the telephone interface 14 and to the further functions 16 by a bus system 18 for data interchange purposes. There can moreover be provision for the combination instrument 3 likewise to have a display that is actuated by the display and user input control 10. Control of the navigation system 11, the infotainment system 12, the automatic airconditioning system 13, the telephone interface 14 or the telephone 15 and the other functions 16, in particular, under menu guidance, can be effected by the touchscreen, by the cross rocker switches 5 and 6 and by a voice input 20, depicted in FIG. 3, which has an associated microphone 21. Outputs from the system are provided by the display 4, by a display in the combination instrument 3 and/or by a loudspeaker 22.

Figure 3:
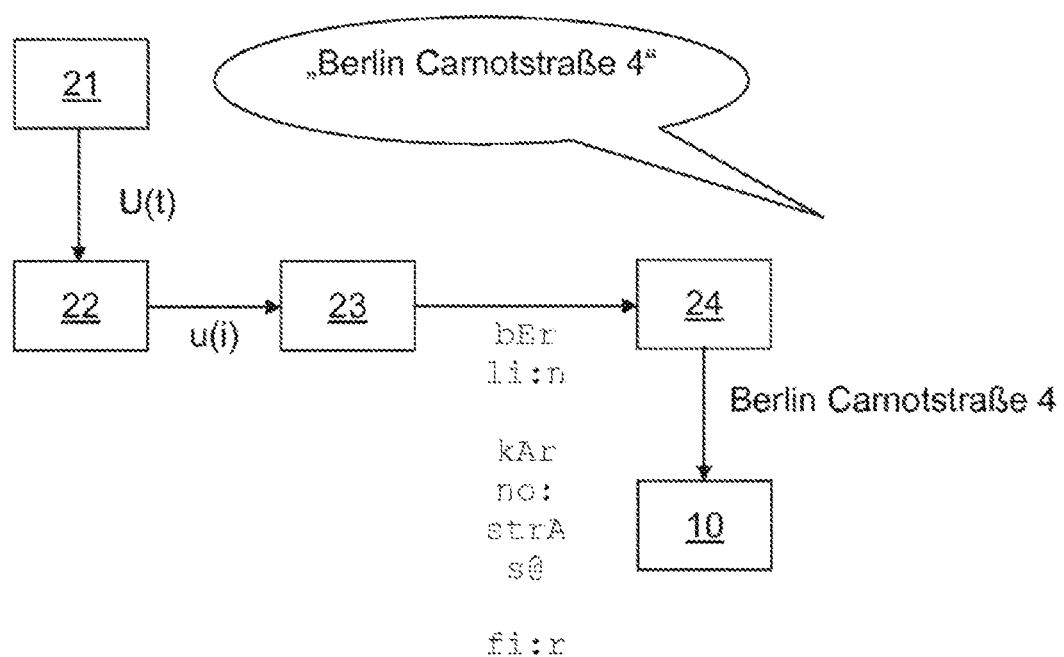
FIG. 3 shows an exemplary embodiment of a voice recognition system of the transportation vehicle of FIG. 1 or FIG. 2.

The voice recognition 20 portrayed in FIG. 3 comprises a phenome generation module 23 for generating phonemes from a voice signal or the output signal $U(t)$ of the microphone 21 or the applicable output signal $u(i)$ of the A/D converter 22 for digitizing the output signal $U(t)$ of the microphone 21. To this end, there is provision for a subword recognition module that firstly recognizes syllables as entire words, instead of the terms/words from the database. In languages having an appropriate writing system, these can also use characters such as, e.g., Japanese Katakana or Hiragana. In this manner, the search space for the voice recognition is reduced from several ten thousand to one hundred thousand terms from the database (e.g., all cities and streets in Germany) to a few dozen (phonemes of the German language) or thousand (German syllables). For recognizing phonemes/syllables, statistical language models (SLMs) are used that have been trained for phonemes/syllables of the respective language. For the input "Berlin Carnotstraβe 4", the SLM is trained, e.g., with the syllables bEr
li:n
kAr
no:
StrA
s@
fi:r.

The SLM thus trained is used for recognition during operation of the transportation vehicle 1. If the user is supposed to be able to say terms outside these training data, e.g., carrier sentences such as "take me to . . . ", the SLM is embedded as a spacer in a further, more general SLM that additionally comprises these carrier sentences.

The output value of the phoneme generation module 23 is the input value for a phoneme-to-grapheme module 24 for generating inputs for controlling the transportation vehicle 1 on the basis of a succession of monosyllabic phonemes generated by the phoneme generation module 23 (Deep Phoneme-to-Grapheme). In this case, the recognized phonemes or syllables are automatically converted into terms in the language. This conversion is also called phoneme-to-grapheme conversion.

Figure 4:
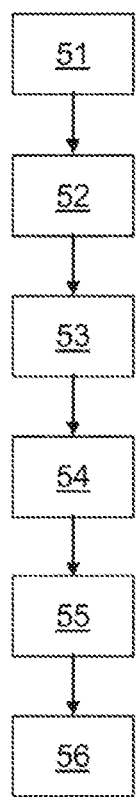
FIG. 4 shows an exemplary embodiment of a method for manufacturing the transportation vehicle of FIG. 1 or FIG. 2.

FIG. 4 shows an exemplary embodiment of a method for manufacturing a transportation vehicle having an aforementioned voice input. In this case, an operation at 51 involves a first database of inputs and commands for controlling functions of the transportation vehicle, in particular, the navigation system 11 of the transportation vehicle 1, being provided. There follows an operation at 52 for generating a second database of exclusively monosyllabic phonemes, as shown in FIG. 5, for example.

There follows an operation at 53 for generating or training the phoneme generation module 23 by the first database. This involves an SLM being trained (in a manner known to a person skilled in the art) for subword voice recognition from known sequences of phonemes in syllable form from the target domain (e.g., navigation).

There follows an operation at 54 for generating or training an RNN as phoneme-to-grapheme module 24 by the second database (as depicted in FIG. 5, for example). The RNN is trained for phoneme-to-grapheme from terms arranged in pairs and the pronunciation of the terms (in syllable form). This involves the use of a deep learning approach for mapping text sequences onto other text sequences. A recurrent neural network (RNN) is trained using terms from the target domain—e.g., the navigation database—and the respective phonemes/syllables thereof. Examples of training data (association of term→phonemes/phonetics):

Berlin→bEr li:n/
Carnotstraβe→/kAr no: StrA s@/
4→/fi:r/

The RNN thus trained is capable of drawing conclusions about the spelling of arbitrary terms from the domain on the basis of phonemes. From the input of the phonemes /ku:r fyr st@n dAm/, the RNN infers the term "Kurfürstendamm", for example. This also applies to terms unseen during the training.

There follows an operation at 55 for connecting the output of the phoneme generation module 23 to the input of the phoneme-to-grapheme module 24 for data interchange purposes. Operation at 55 is followed or preceded by an operation at 56 for implementing the phoneme generation module and the phoneme-to-grapheme module in the transportation vehicle.

Disclosed embodiments allow lean, memory-efficient processing of voice inputs that relates to large amounts of content without explicitly knowing the content. It therefore allows system development that is independent of content and data updates and thus dispenses with costly updates and subsequent developments. Voice control systems can further dispense with memory- and computation-intensive server performance and the need for an online connection during frequent control cycles in the input processing. The disclosed embodiments additionally allow input processing that permits the user to make inputs that are flexible in terms of order and expression and hence considerably raises the performance of the voice recognition in the transportation vehicle.

The invention claimed is:

1. A transportation vehicle comprising:
    a navigation system;
    a user input control connected to the navigation system via a bus system for data interchange purposes,
    a microphone;
    a phoneme generation module that includes a statistical language model for generating phonemes from a voice signal and/or the output signal of the microphone, wherein the phonemes are part of a prescribed selection of exclusively monosyllabic phonemes; and
    a phoneme-to-grapheme module that includes a recursive neural network, the recursive neural network comprising between 2 and 4 intermediate layers and a recall layer having a dimension of between 10 and 30, the recursive neural network generating inputs for controlling the transportation vehicle based on a succession of monosyllabic phonemes generated by the phoneme generation module, wherein the phoneme-to-grapheme module is trained substantially exclusively using entries associated in pairs, which entries comprise a monosyllabic phoneme that has a respective associated monosyllabic term.

2. The transportation vehicle of claim 1, wherein the dimension of the input layer is equal to the number of phonetic symbols from which syllables are formed.

3. The transportation vehicle of claim 1, wherein the dimension of the output layer is equal to the number of characters in the target language.

4. A method for manufacturing a transportation vehicle that includes a navigation system, a user input control connected to the navigation system via a bus system for data interchange purposes, a microphone, a phoneme generation module that includes a statistical language model for generating phonemes from a voice signal and/or the output signal of the microphone, wherein the phonemes are part of a prescribed selection of exclusively monosyllabic phonemes, and a phoneme-to-grapheme module that includes a recursive neural network, the recursive neural network comprising between 2 and 4 intermediate layers and a recall layer having a dimension of between 10 and 30, the recursive neural network generating inputs for controlling the transportation vehicle based on a succession of monosyllabic phonemes generated by the phoneme generation module, wherein the method comprises:

provffding a first database of inputs or commands for controlling functions of the transportation vehicle;

generating a second database that comprises exclusively monosyllabic phonemes;

training the phoneme generation module by using the first database;

training the phoneme-to-grapheme module by using the second database, wherein the phoneme-to-grapheme module is trained substantially exclusively using entries associated in pairs, which entries comprise a monosyllabic phoneme that has a respective associated monosyllabic term;

connecting the output of the phoneme generation module to the input of the phoneme-to-grapheme module for data interchange purposes; and implementing the phoneme generation module and the phoneme-to-grapheme module in a transportation vehicle.

5. The method of claim 4, wherein the second database comprises phonemes that are exclusively monosyllabic.

6. The method of claim 4, wherein the second database comprises entries associated in pairs, wherein a monosyllabic phoneme has a respective associated monosyllabic term.

7. The transportation vehicle of claim 4, wherein the dimension of the input layer is equal to the number of phonetic symbols from which syllables are formed.

8. The transportation vehicle of claim 4, wherein the dimension of the output layer is equal to the number of characters in the target language.

* * * * *